United States Patent [19]

Sasaki et al.

[11] Patent Number: 5,187,032
[45] Date of Patent: Feb. 16, 1993

[54] SOLID POLYMER ELECTROLYTES

[75] Inventors: Takashi Sasaki, Tokyo; Isao Ishigaki, Gunma; Syuichi Izuchi, Shiga; Tomohiko Noda, Osaka, all of Japan

[73] Assignees: Yuasa Battery Co., Ltd., Osaka; Japan Atomic Energy Research Institute, Tokyo, both of Japan

[21] Appl. No.: 685,677

[22] Filed: Apr. 16, 1991

[30] Foreign Application Priority Data

Apr. 17, 1990 [JP] Japan ................... 2-100803

[51] Int. Cl.$^5$ ........................................ H01M 6/16
[52] U.S. Cl. ............................... 429/192; 252/62.2; 29/25.03
[58] Field of Search ................. 429/192; 252/62.2

[56] References Cited

U.S. PATENT DOCUMENTS

| | | | |
|---|---|---|---|
| 4,303,748 | 12/1981 | Armand et al. | 429/192 |
| 4,357,401 | 11/1982 | Andre et al. | |
| 4,792,504 | 12/1988 | Schwab et al. | 429/192 |
| 4,818,643 | 4/1989 | Cook et al. | 429/192 X |
| 4,990,413 | 2/1991 | Lee et al. | 429/192 X |

FOREIGN PATENT DOCUMENTS 62-219470  9/1987  Japan .

OTHER PUBLICATIONS

Cowie et al, *Chemical Abstracts* vol. 106, No. 139040 (1987).
Cowie et al., "Ionic conductivities and glass transition temperatures in poly(vinyl methyl ether)-salt mixtures", Polymer Bulletin, vol. 17, pp. 113-117 (1987).
*Complexes of Alkalai Metal Ions with Poly (Ethylene Oxide)*, Fenton, D. E., Polymers, 1973, vol. 14, p. 589 Nov.

*Primary Examiner*—Stephen Kalafut
*Attorney, Agent, or Firm*—Banner, Birch, McKie & Beckett

[57] ABSTRACT

There is described a solid polymer electrolyte containing an ionic salt in a three-dimensional crosslinked compound of a poly(vinylalkyl ether) represented by the following general formula:

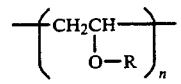

(where R is $CH_3$, $C_2H_5$ or $CH(CH_3)(C_2H_5)$; and n is an integer of 100–2,000). The poly(vinylalkyl ether) is preferably poly(vinylmethyl ether) and crosslinked by exposure to an ionizing radiation. The solid polymer electrolyte also contains a compound that is capable of solubilizing the ionic salt.

12 Claims, No Drawings

SOLID POLYMER ELECTROLYTES

BACKGROUND OF THE INVENTION

This invention relates to solid polymer electrolytes suitable for use with primary batteries, secondary batteries, electrochromic displays, electrochemical sensors, ion-tophoretic devices, capacitors and other electrochemical devices.

Conventional solid polymer electrolytes are generally in the form of compositions that contain lithium perchlorate and other salts in thermoplastic polyethers such as high-molecular weight polyethylene oxide, three-dimensional cross-linked compounds of polyethers such as polyethylene oxide, and graft copolymers having linear polyethylene oxide side chains in backbone chains such as polyphosphazine chains, polysiloxane chains, polyethylene chains and polypropylene chains.

Thermoplastic polyethers such as high-molecular weight polyethylene oxide and the above-mentioned graft copolymers both have low mechanical strength and their ion conductivity is also low at temperatures lower than room temperature. The mechanical strength and ionic conductivity at low temperatures of polyethers might be enhanced by crosslinking them into a three-dimensional network. Polyethers such as polyethylene oxide are capable of solubilizing large amounts of salts such as lithium perchlorate but they have a great tendency to form complexes with a lithium ion, causing crystallization through strong binding. In an attempt at improving the ionic conductivity of polyethers such as polyethylene oxide at low temperatures, it has recently been proposed that they be dissolved uniformly in solvents such as propylene carbonate together with salts to form three-dimensional crosslinked compounds. However, the incorporation of solvents in large amounts has lead to a lower mechanical strength.

SUMMARY OF THE INVENTION

The present invention has been accomplished under these circumstances and has as an object providing a solid polymer electrolyte that has improved ionic conductivity and mechanical strength.

This object of the present invention can be attained by a solid polymer electrolyte that has an ionic salt in a three-dimensional crosslinked compound of a poly(vinylalkyl ether) represented by the following general formula:

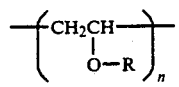

(where R is $CH_3$, $C_2H_5$ or $CH(CH_3)(C_2H_5)$; and n is an integer of 100–2,000).

In a preferred embodiment of the present invention, poly(vinylmethyl ether) is used as the poly(vinylalkyl ether).

In another preferred embodiment, the solid polymer electrolyte is composed of a three-dimensional crosslinked compound of poly(vinylalkyl ether) containing not only an ionic salt but also a compound that is capable of solubilizing said ionic salt.

In yet another preferred embodiment, the solid polymer electrolyte is composed of the three-dimensional crosslinked compound that is crosslinked with a diacrylic acid ester compound and/or a dimethacrylic acid ester compound.

In another preferred embodiment, the solid polymer electrolyte is compound of the three-dimensional cross-linked compound that is crosslinked by exposure to an ionizing radiation.

DETAILED DESCRIPTION OF THE INVENTION

Preferred but non-limiting examples of the ionic salt that can be used in the present invention include $LiClO_4$, $LiBF_4$, $LiAsF_6$, $LiCF_3SO_3$, $LiPF_6$, $LiI$, $LiBr$, $LiSCN$, $NaI$, $Li_2B_{10}Cl_{10}$, $LiCF_3CO_2$, $NaBr$, $NaSCN$, $NaClO_4$, $KSCN$, $KClO_4$, $MgCl_2$, $Mg(ClO_4)_2$, $(CH_3)_4NBF_4$, $(CH_3)_4NBr$, $(C_2H_5)_4NClO_4$, $(C_2H_5)_4NI$, and $(n-C_5H_{11})_4NI$.

Preferred but non-limiting examples of the compound that is capable of solubilizing the ionic salt include tetrahydrofuran, 2-methyltetrahydrofuran, 1,3-dioxolane, 4,4-dimethyl-1, 3-dioxolane, $\gamma$-butyrolactone, propylene carbonate, ethylene carbonate, butylene carbonate, sulfolane, 3-methylsulfolane, tert-butyl ether, iso-butyl ether, 1,2-dimethoxyethane, 1,2-ethoxymethoxyethane, methyl diglyme, methyl triglyme, methyl tetraglyme, ethyl glyme, ethyl diglyme and mixtures thereof.

Exposure to ionizing radiations is an efficient method of crosslinking. Exemplary ionizing radiations include $\gamma$-rays, X-rays, electron beams and neutron beams.

EXAMPLES

The following examples are provided for the purpose of further illustrating the present invention but are in no way to be taken as limiting.

EXAMPLE 1

Propylene carbonate (250 g) having 1 mol/l of lithium trifluoromethanesulfonate dissolved therein and 130 g of a 70% toluene solution of poly(vinylmethyl ether) were charged into a flask and refluxed at 120° C. to form a uniform solution. Toluene was then removed from the solution under vacuum. Subsequently, diacrylate represented by the formula $(CH_2:CHC(O)O)_2C_6H_{12}$ was mixed as a crosslinking agent in such an amount that the weight ratio of poly(vinylmethyl ether) to diacrylate was 10:3. The mixture was cast to form a 100-$\mu$m thick film in a stainless steel petri dish, which was irradiated to a dose of 10 Mrad with electron beams at an acceleration voltage of 300 kV in a nitrogen atmosphere. The irradiated film was transparent and highly elastic and had high mechanical strength. The ionic conductivity of this film as measured by the Cole-Cole plot method was $5 \times 10^{-4}$ S $cm^{-1}$ (25° C.). In order to examine the mechanical strength of the film, its rupture strength was measured by applying a load to the sample that was placed on the top of a stainless steel disk (5 mm$\phi$). The film was found to have a strength of 32 kg/cm$^2$.

EXAMPLE 2

A film of solid polymer electrolyte was prepared by repeating the procedure of Example 1 except that lithium perchlorate was used in place of lithium trifluoromethanesulfonate.

The film had an ionic conductivity of $1 \times 10^{-3}$ S $cm^{-1}$ (25° C.) and a rupture strength of 30 kg/cm$^2$. The thickness of the film was 100 $\mu$m.

COMPARATIVE EXAMPLE

Thirty parts by weight of polyethylene oxide acrylate (mol. wt. 400) was dissolved in 70 parts by weight of a solution having 1 mol/l of LiClO$_4$ dissolved in propylene carbonate. To the solution, 0.05 parts by weight of azoisobutyronitrile was added and the mixture was heated at 100° C. for 1 h in a nitrogen stream to form a film having a thickness of 100 μm. The film had an ionic conductivity of $7 \times 10^{-4}$ S cm$^{-1}$ and a rupture strength of 10 kg/cm$^2$.

As described on the foregoing pages, the solid polymer electrolyte of the present invention is composed of a three-dimensional crosslinked compound of poly(vinylalkyl ether) containing an ionic salt. This solid polymer electrolyte has improved ionic conductivity and mechanical strength and hence will offer great industrial benefits.

What is claimed is:

1. A solid polymer electrolyte containing an ionic salt in a three-dimensional crosslinked compound of a poly(vinylalkyl ether) represented by the following general formula:

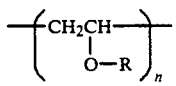

(where R is CH$_3$, C$_2$H$_5$ or CH(CH$_3$)(C$_2$H$_5$); and n is an integer of 100–2,000).

2. A solid polymer electrolyte according to claim 1 wherein said poly(vinylalkyl ether) is poly(vinylmethyl ether).

3. A solid polymer electrolyte according to claim 1 or 2 which also contains a compound that is capable of solubilizing said ionic salt.

4. The solid polymer electrolyte according to claim 1 wherein a crosslinking agent selected from the group consisting of diacrylic acid ester compounds, dimethacrylic acid ester compounds, and mixtures thereof, is used.

5. The solid polymer electrolyte according to claim 2 wherein a crosslinking agent selected from the group consisting of diacrylic acid ester compounds, dimethacrylic acid ester compounds, and mixtures thereof, is used.

6. The solid polymer electrolyte according to claim 3 wherein a crosslinking agent selected from the group consisting of diacrylic acid ester compounds, dimethacrylic acid ester compounds, and mixtures thereof, is used.

7. The solid polymer electrolyte according to claim 1 wherein the poly(vinylalkyl ether) is crosslinked by exposure to an ionizing radiation.

8. The solid polymer electrolyte according to claim 2 wherein the poly(vinylalkyl ether) is crosslinked by exposure to an ionizing radiation.

9. The solid polymer electrolyte according to claim 3 wherein the poly(vinylalkyl ether) is crosslinked by exposure to an ionizing radiation.

10. The solid polymer electrolyte according to claim 4 wherein the poly(vinylalkyl ether) is crosslinked by exposure to an ionizing radiation.

11. The solid polymer electrolyte according to claim 5 wherein the poly(vinylalkyl ether) is crosslinked by exposure to an ionizing radiation.

12. The solid polymer electrolyte according to claim 6 wherein the poly(vinylalkyl ether) is crosslinked by exposure to an ionizing radiation.

* * * * *